US008401814B1

(12) United States Patent
Kureck

(10) Patent No.: US 8,401,814 B1
(45) Date of Patent: Mar. 19, 2013

(54) HOIST SYSTEM WITH AN ELECTRONIC PROGRAMMABLE LIMIT SWITCH

(75) Inventor: Aaron Kureck, Oconomowoc, WI (US)

(73) Assignee: Magnetek, Inc., Menomonee Falls, WI (US)

( * ) Notice: Subject to any disclaimer, the term of this patent is extended or adjusted under 35 U.S.C. 154(b) by 931 days.

(21) Appl. No.: 12/334,911

(22) Filed: Dec. 15, 2008

Related U.S. Application Data

(60) Provisional application No. 61/013,930, filed on Dec. 14, 2007.

(51) Int. Cl.
*G01C 9/00* (2006.01)
*G01C 17/00* (2006.01)
*G01C 19/00* (2006.01)

(52) U.S. Cl. ......... 702/150; 702/151; 254/268; 254/270

(58) Field of Classification Search .................. 702/150, 702/151; 254/268, 270; 242/534, 563, 564.1
See application file for complete search history.

(56) References Cited

U.S. PATENT DOCUMENTS

| | | | | |
|---|---|---|---|---|
| 3,883,859 | A * | 5/1975 | Ancheta | 212/282 |
| 7,097,155 | B2 * | 8/2006 | Jackson et al. | 254/276 |
| 7,284,743 | B1 * | 10/2007 | Brighton et al. | 254/268 |

* cited by examiner

*Primary Examiner* — Sujoy Kundu
(74) *Attorney, Agent, or Firm* — Waddey & Patterson, P.C.; Mark J. Patterson

(57) ABSTRACT

An electronic limit switch software module is programmed into a controller for a hoist system. The electronic limit switch determines the rotations of a motor to keep track of the location of the load. Arbitrary stop and slow down locations may be input into the system so that the system can determine when to stop and slow down the load.

8 Claims, 7 Drawing Sheets

HOIST SYSTEM WITH AN ELECTRONIC PROGRAMMABLE LIMIT SWITCH

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to a limit switch for a hoist or winch system to slow down and stop hoist motion at preset locations. More specifically, this invention pertains to an electronic programmable limit switch which eliminates the need for traditional mechanical components.

In a conventional hoist arrangement, a motor turns a drum through a gear system. As the drum rotates, a load is either lifted or lowered by a cable. This lifting and lowering of the load must be controlled so that the load is delivered to specific locations along the vertical range of the hoist system. In addition, the hoist system must stop the lowering or lifting at both the top and the bottom of the vertical range. Traditionally, a geared limit switch is used to stop and slow down the lift. Conventional limit switches work by using adjustable cams that trip electrical switches at preset locations. These switches are, in turn, wired to multi-function digital input terminals or in series with raise/lower run commands. Because these traditional limit switches are mechanical devices, the parts are subject to wear, tear, and vibration problems which can loosen the cams and screws within the device. This wear and tear introduces safety concerns and an increased maintenance cost for the hoist system.

Furthermore, conventional limit switches suffer from hysteresis if the direction of lifting is quickly changed around slow-down locations. Because the limit switch had been tripped after passing the slow-down location, the hoist system required an amount of time to reset the limit switch thereby causing a lag in the reaction time of the system if the direction of lifting was quickly reversed.

FIG. 1 illustrates a prior art arrangement for a hoist system. The hoist system has a motor 10 connected to a shaft 15 for turning a drum 20. A lifting cable 25 is wound about the drum 20 as the motor 10 turns the shaft 15 to lift a load. Component 30 represents a typical geared limit switch. Hoist systems are required to automatically stop the lifting or the lowering of the load when the load reaches an upper stopping location and when the load reaches a lower stopping location. Furthermore, there may be locations for slowing the load prior to reaching the top of the hoist system or the bottom of the hoist system. To accomplish this function in the typical system, the typical geared limit switch 30 has adjustable cams that trip electrical switches at preset locations. The cams and electrical switches are subject to the typical wear and tear problems of a mechanical system. As a result, the typical geared limit switch 30 introduces significant safety concerns and higher maintenance costs for the hoist system.

What is needed then is a device which eliminates the mechanical jams and hysteresis of trip switches while keeping track of the motor revolutions, thereby eliminating the safety concerns and higher maintenance costs of current hoist system arrangements.

BRIEF SUMMARY OF THE INVENTION

To eliminate the disadvantages of traditional mechanical limit switches, the mechanical limit switch in the hoist system is replaced with an electronic programmable limit switch software module, which preferably uses an incremental encoder with a magnetic or optical pulse wheel. An incremental encoder has a small disc marked with a large number of radial lines or magnetic hash marks. The disc is coupled to a shaft and, in the simplest example, the device has one line or hash mark on the disc representing the zero position. A photodiode is positioned at a fixed location along the angular rotation of the disc. As the line or hash mark passes the photo diode or magnetic sensors field of view, an electrical pulse is generated and sent to the electronic controls of the system. To detect the direction of rotation, a second photo diode or magnetic sensor is placed at a different fixed location along the angular rotation of the disc. The direction of rotation can thus be inferred from the order in which the two sensors detect the radial line or hash marks. In this manner, the number of motor revolutions between the bottom and the top of the hoist can be determined and utilized by the electronic programmable limit switch to keep track of the location of the load. Furthermore, the system can determine whether the hoist is raising or lowering the load.

DETAILED DESCRIPTION OF THE INVENTION

Figure 1:
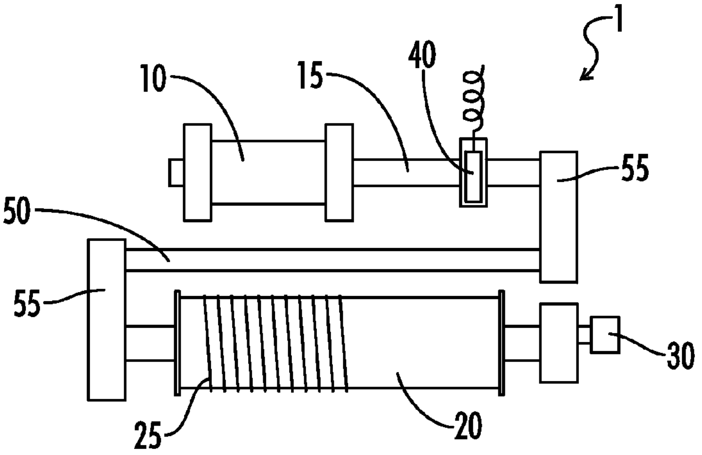
FIG. 1 (PRIOR ART)
FIG. 1 is a top view of a hoist system with a prior art geared limit switch.
Figure 1A:
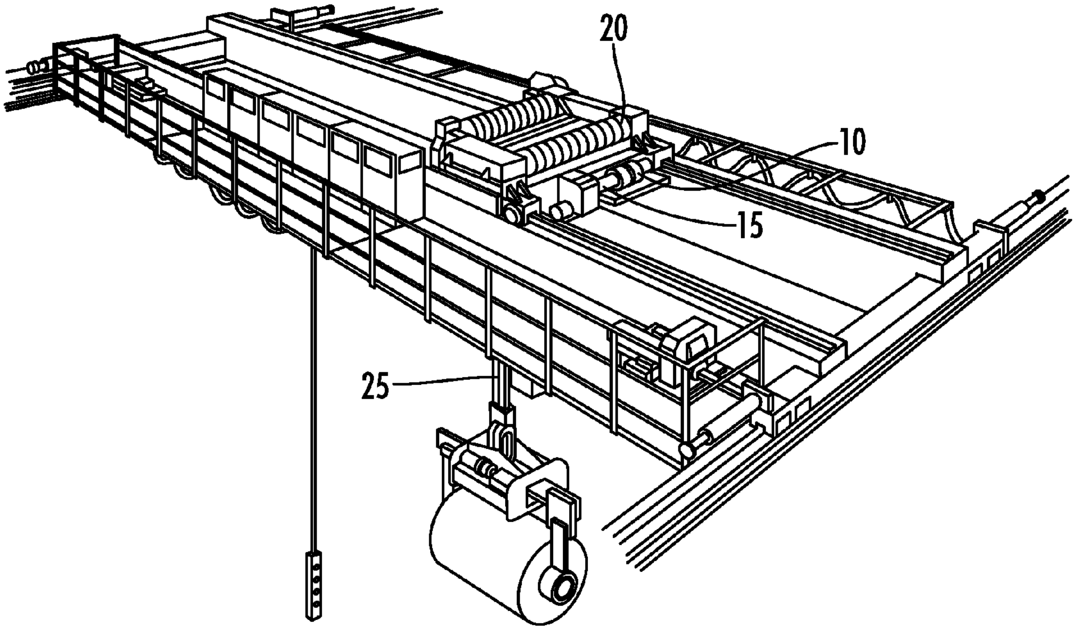
FIG. 1A is a perspective view of one embodiment of the hoist system in accordance with the present invention.
Figure 1B:
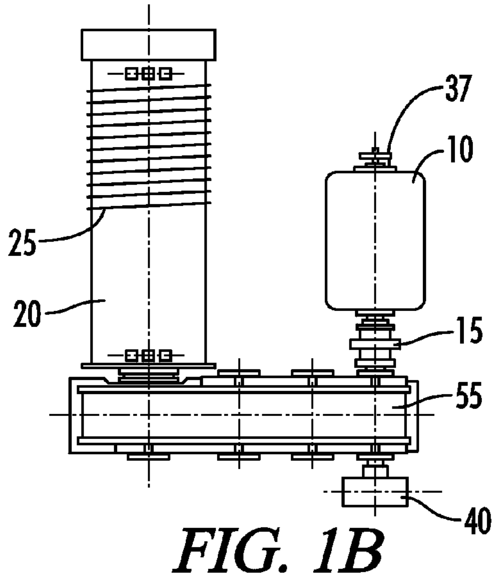
FIG. 1B is a top view of the hoist system of FIG. 1A that includes one embodiment of the electronic programmable limit switch in accordance with the present invention.
Figure 1C:
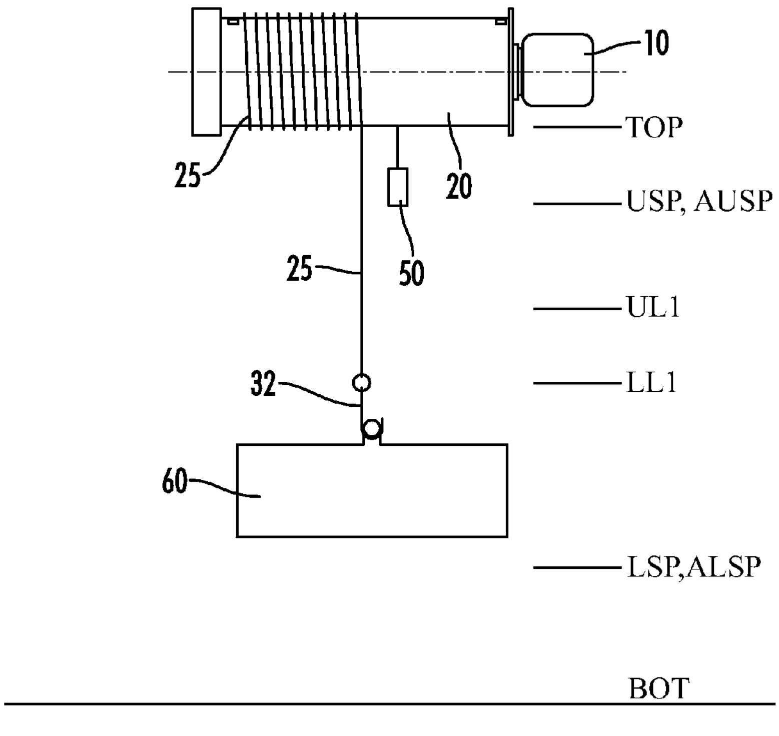
FIG. 1C is a side view of the hoist system of FIG. 1A lifting a load.

Referring now to FIGS. 1A-1C, a hoist system in accordance with the invention is shown. The hoist system utilizes an electronic programmable limit switch software module 35 (FIG. 3) to control the lowering and lifting of a load 60. As illustrated, the system uses a motor 10 to turn a shaft 15 which is connected to a drum 20. Gear reductions 55 may be provided between the drum 20 and the motor 10 to adjust the velocity ratio between the motor 10 and the drum 20. The drum 20 winds a cable 25 connected to a hook 32. In this manner, a load 60 attached to the hook 32 is lifted and lowered by the hoist system.

Figure 3:
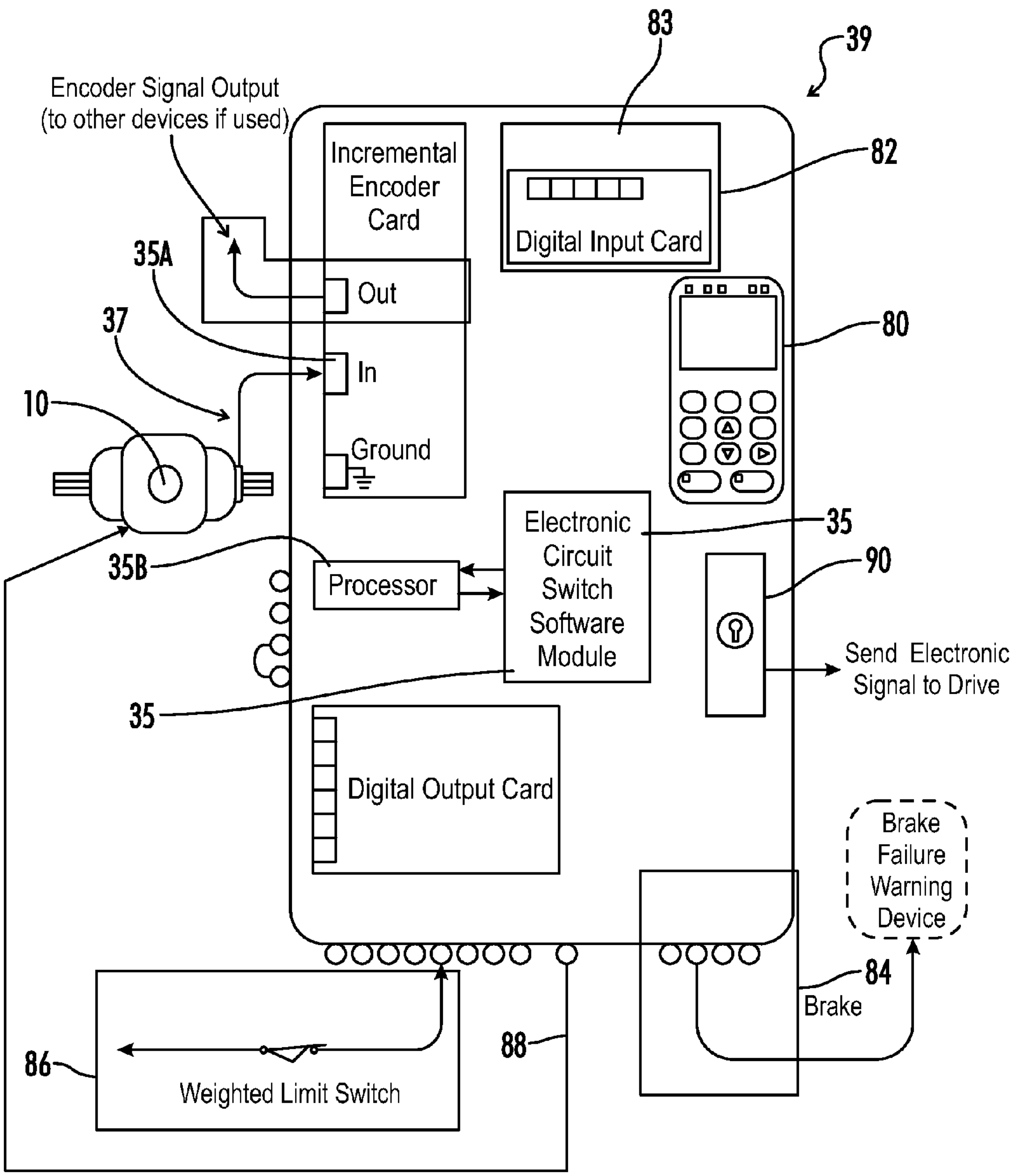
FIG. 3 is an illustration of one embodiment of a control system for the electronic programmable limit switch of the present invention.

However, instead of a geared limit switch 30 as shown in FIG. 1, the hoist system utilizes an electronic programmable limit switch software module 35 as shown in FIG. 3. The electronic programmable limit switch 35 may be imbedded in the variable frequency drive of the hoist system and may utilize the same encoder 37 (FIG. 3) that the variable frequency drive uses to measure speed. However, instead of utilizing the encoder to determine the speed, the encoder is utilized to determine the total number of component revolutions required to move the load through the lifting range of the hoist system. The encoder can then be used to determine a current position of the load in the lifting range in accordance with the number of component revolutions required to move the load from a starting location on the hoist system to the current location.

In the illustrated embodiment of FIGS. 1A-1C, the geared limit switch is completely removed from the hoist system. It should be understood however that the electronic programmable limit switch software module 35 may be used in parallel with a typical geared limit switch 30 (FIG. 1) or may utilize geared limit switches 30 to indicate selected relevant locations, such as slow down locations, along the lifting range of the hoist system.

The electronic programmable limit switch software module 35 may have four preset positions to stop and slow down the load 60. Referring now specifically to FIG. 1C, these four positions may be: the lower stop position LSP, the lower limit slow down LL1, the upper limit slow down UL1, and the upper stop position USP. Furthermore, the lower stop position LSP and the upper stop position USP may be at the very bottom BOT and top TOP of the lifting range of the hoist system respectively or the user may select an arbitrary lower stop position (ALSP) and an arbitrary upper stop position (AUSP) along the vertical range of the hoist system. The hoist system does not experience hysteresis because, unlike the geared limit switch, no mechanical components are required to set the desired slow down and stop positions with the electronic programmable limit switch software module 35.

Other preset positions may be selected by the user in accordance with the particular job being performed by the hoist system and/or other mechanical characteristics of the hoist system relevant to a particular application.

FIG. 3 shows an embodiment of the controller 39 for the electronic programmable limit switch software module 35 that is part of the variable frequency drive of the hoist system. Electronic programmable limit switch software module 35 is executed by the processor 35B. The motor 10 thus causes the incremental encoder 37 to rotate when the load 60 is being lowered or lifted. The electronic programmable limit switch software module 35 may utilize the incremental encoder 37 to determine the number of motor or shaft revolutions required to travel from the top of the hoist system TOP to the very bottom of the hoist system BOT.

To accomplish this, the incremental encoder 37 may be rotated whenever a hoist component, such as the shaft 15, is turned an angular distance. The incremental encoder 37 then transmits an indicator signal, normally in the shape of a pulse, to controller 39. Controller 39 translates the indicator signal into data that is utilized by electronic programmable limit switch software module 35 to determine whether a motor revolution has occurred. For example, electronic programmable limit switch software module 35 may know that a motor revolution occurs after a certain number of pulses. In one embodiment, the electronic programmable limit switch software module 35 may be set to know that every 1024 pulses is equal to a motor revolution.

As mentioned previously, this incremental encoder 37 may simply be the encoder utilized by the variable frequency drive to determine the lifting speed of the hoist system. The incremental encoder 37 is connected into input terminal 35A on the controller 39 of the electronic programmable limit switch shown in FIG. 3. Controller 39 receives the indicator signal from the incremental encoder 37 which the controller 39 utilizes as explained to control the motor 10. The indicator signal may be a pulse that is produced whenever the incremental encoder 37 detects a hoist component rotation.

Figure 2A:
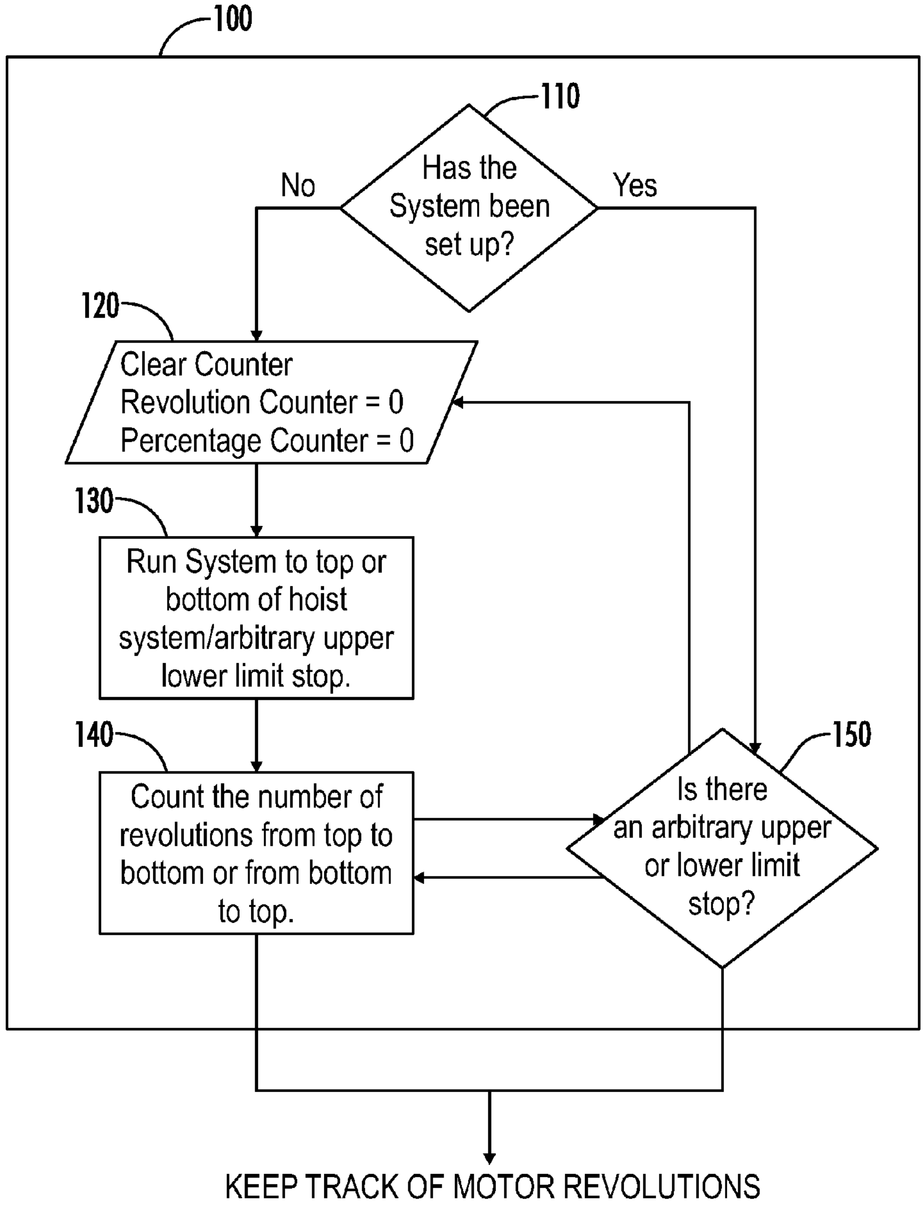
FIG. 2A is a flow diagram of the steps utilized to setup a hoist system with an electronic programmable limit switch in accordance with the present invention.

Referring now to FIG. 2A, a method of setting up the hoist system with the electronic programmable limit switch software module is shown. Step 100 performs a height measurement setup for homing the hoist system. At step 110 the system determines whether the hoist system has been previously setup. If the system has not been previously setup, then the system clears a revolution counter value and a percentage counter value at step 120. At steps 130 and 140, the hoist system is moved through the desired lifting range and the electronic programmable limit switch software module 35 counts the number of pulses required for lifting from the top TOP to the bottom BOT or from the bottom BOT to the top TOP of the desired lifting range depending on the selected starting location of the hoist system.

In the preferred embodiment, the revolution counter is incremented by every pulse received from the encoder. Consequently, the revolution counter counts the number of encoder revolutions which is indirectly related by a ratio to the number of motor and shaft revolutions. However, the revolution counter may instead increment the revolution counter after a specified number of pulses to directly measure the position by the number of motor or shaft revolutions. Directly measuring the motor or shaft revolutions may lead to inaccuracies in the position of the load and is not preferable. The "number of revolutions" as discussed in this disclosure may mean the number of encoder disc, shaft, or motor revolutions, or any other number of revolutions measured from a component on the hoist system that can be utilized to quantify the amount that the drum with the cable of the hoist system has been turned.

The revolution counter is incremented until the system reaches the ending location at the top TOP or bottom BOT of the hoist system. In this manner, the number of revolutions required to cover the vertical distance between the top TOP and bottom BOT of the hoist system can be counted by the electronic programmable limit switch software module. The value of the total number of revolutions from top TOP to bottom BOT of the hoist system is stored.

Next, at step 150, the system determines if the user has entered an arbitrary upper AUSP or lower stop position ALSP. If an arbitrary upper or lower stop position, AUSP, ALSP has been set by the user, the system maybe set up to make the required stops in several ways. In one method, if the system has already been set up, but the user has set up an arbitrary upper or lower stop position, AUSP, ALSP, then the system goes back to step 120 where the revolution counter value and the percentage counter value are reset. At step 130, the system is run either to the arbitrary upper stop position, AUSP or to the arbitrary lower stop position, ALSP. At step 140, the system again counts the total number of motor revolutions required to travel from the arbitrary upper stop position AUSP to the arbitrary lower stop position ALSP. In this manner, the system will be homed to run through the desired vertical range and have the appropriate stops.

In the alternative and preferably, as shown in steps 140 and step 150, if the total number of revolutions from the top of the system TOP to the bottom of the system BOT are known, then the system may be set so that the system stops approximately at a known revolution counter value. For example, if the system was run from the top TOP to the bottom BOT of the hoist system, then the system is homed to record the number of revolutions from the top TOP of the hoist system to the arbitrary upper stop position AUSP. The system can then either be at a stop location value when the revolution counter value reaches this value, or the system may set the revolution counter value at 0 at this location. If an arbitrary lower stop position ALSP has also been set, then the system can know the number of revolutions from the top of the hoist system to the arbitrary lower stop position ALSP. The system can then be set up to stop the lowering and lifting of the load whenever the revolution counter value reaches this user-defined value for the lower stop position ALSP. However, if the revolution counter value was reset to 0 at the arbitrary upper stop position AUSP, then the number of revolutions from the top TOP to the arbitrary upper stop position AUSP will be subtracted from the value of the total number of revolutions which were required to get from the top TOP of the hoist system to the desired bottom location. A similar subtraction is also performed if an arbitrary lower stop position ALSP has been set as the desired bottom location.

If the system has already been setup, then the system automatically proceeds to step 150. The system has the capability of recording the above mentioned values. Thus, steps 120, 130 and 140 can be skipped. The system can store the current revolution value at power down, and therefore the system does not have to be homed upon every power up.

Referring now to FIG. 1C and to table A below, the system has a limit option value and a percentage option value which configure the starting location for the system. If the limit option is set to either 0 or 1, then the system will be set to run from the top of the hoist system TOP to the bottom of the hoist system BOT. Thus, arbitrary upper and lower stopping positions, AUSP, ALSP have not been set. As shown in table A, if no arbitrary upper and lower stopping positions, AUSP, ALSP have been set, then arbitrary upper stopping positions and arbitrary lower stopping positions values are not applicable.

TABLE A

| LIMIT OPTION | PERCENTAGE OPTION | AUSP | UL1 | LL1 | ALSP |
|---|---|---|---|---|---|
| 0 | 0 | Arbitrary Values | 55 REV | 220 REV | Arbitrary Values |
| | 1 | Arbitrary Values | 195 REV | 30 REV | Arbitrary Values |
| 1 | 0 | Arbitrary Values | 195 REV | 30 REV | Arbitrary Values |
| | 1 | Arbitrary Values | 55 REV | 220 REV | Arbitrary Values |
| 2 | 0 | 20 REV | 55 REV | 220 REV | 240 REV |
| | 1 | 230 REV | 195 REV | 30 REV | 10 REV |
| 3 | 0 | 230 REV | 195 | 30 REV | 10 |
| | 1 | 20 | 55 | 220 | 240 |

Limit Option:
0: Starting Location Top of the Hoist System (Default)
1: Starting Location Bottom of the Hoist System
2: Starting Location Arbitrary Top Location
3: Starting Location Arbitrary Lower Location If the limit option has been set to 0, then the starting location is at the top TOP of the hoist system. The revolution counter value should thus read 0 when the hook is at the top of the hoist system TOP, and the revolution counter value should equal the total number of revolutions at the bottom of the hoist system BOT. In the alternative, the limit option may be set to 1. In this case, the revolution counter value reads 0 at the bottom of the hoist system BOT and reads the total number of revolutions at the top of the hoist system TOP.

Arbitrary values for the upper limit slow down UL1 and the lower limit slow down LL1 may be set for slowing down the hoist system when the revolution counter value reaches these predetermined values. The hoist system will thus slow down the lifting or lowering of the load 60 when the revolution counter value reaches the values set for the upper limit slow down UL1 and the lower limit slow down LL1. The limit option may also be set to 2 or 3. Preferably, the system has been set up to stop at the AUSP and the ALSP when the revolution counter reaches the revolution counter value for that height instead of resetting the desired start and stop values (as explained above). If an arbitrary upper stop position AUSP has been set and the user wants the arbitrary upper stop position AUSP to be the starting location, the limit option is set to 2. This arbitrary upper stop position AUSP will be considered the starting location of the hoist system and will equal either the number of revolutions from the top of the hoist system TOP to the arbitrary upper stop position AUSP or the total number of revolutions subtracted from the number of revolutions from the top of the hoist system TOP to the arbitrary upper stop position AUSP. As will be explained later, the percentage option value determines which one of these values is selected at the starting location.

In the alternative, the limit option may be set to 3 if the user desires a starting location at an arbitrary lower stop position ALSP. In this case, the device will count the revolutions from the arbitrary lower stop position ALSP to the desired top location (either the top of the hoist system TOP or an arbitrary upper stop location AUSP). The value of the arbitrary lower stop position ALSP will equal either the number of revolutions from the bottom of the hoist system BOT to the arbitrary lower stop position ALSP or the total number of revolutions subtracted from the number of revolutions from the bottom of the hoist system BOT to the arbitrary lower stop position ALSP. Again, the percentage option determines which of these values is selected.

Knowing the total number of revolutions, the percentage counter value may calculate a percentage value for the current hook height equal to the current number of revolutions at the hook height over the total number of revolutions when the hook is lifting and lowering the load. This percentage counter value is also incremented while the load is traveling through the desired lifting range of the hoist system. Typically, this value is communicated to other devices. Whether the percentage counter value should start at 0% or 100% at the starting location may be dependent on device requirements.

Referring again to Table A, the percentage option determines how the revolution counter value and the percentage counter value will increment from the starting location to the ending location. Consequently, a user or the device can set the percentage option in accordance with device requirements. If the percentage option is set to 0, then the starting location begins with the percentage counter value equal to 0%. The revolution counter value also begins at 0 from the starting location. As the system runs from the starting location to the desired ending location, the percentage counter value is run from 0 to 100% and the revolution counter value runs from 0 to the total number of revolutions. On the other hand, if the percentage option is set to 1 then the percentage counter value begins at 100% and the revolution counter value begins at the total number of revolutions.

An example of the use of the limit option and the percentage option will help clarify their function. As shown in Table A, assume that the motor must go through 250 motor revolutions for the hook to travel the vertical range of the hoist system. Furthermore, assume that the user has selected an arbitrary upper stop position AUSP twenty (20) revolutions from the top of the hoist system TOP, an arbitrary lower stop position ALSP ten (10) revolutions from the bottom of the hoist system, the upper limit slow down UL1 fifty-five (55) revolutions from the top of the hoist system TOP and a lower limit slow down LL1 two-hundred twenty (30) revolutions from the bottom of the hoist system BOT. If the limit option is set to 2, then the user has selected that the starting location be the arbitrary upper stop position AUSP. If the percentage option is set to 0, then the starting location, which in this case is the arbitrary upper stop position AUSP, begins the percentage counter value at 0% and the revolution counter value at twenty (20).

From the starting location of twenty (20) revolutions from the top of the hoist system TOP, the system counts down until the system reaches the upper limit slow down UL1 at 55 revolutions. Here the system is programmed to slow its descent. The system continues to count through the revolutions until it reaches two hundred twenty (220) revolutions, the location of the lower limit slow down LL1. Finally, the system will begin a stop sequence when the revolution counter value reaches the ALSP. In this example, an arbitrary lower limit location has been set. The system begins the stop sequence when the hoist system reaches 240 revolutions, the location of the arbitrary lower location.

To illustrate the significance of the percentage option, if the limit option is set to 2, and the percentage option is set to 1, the countdown will occur in reverse order. When the percentage option is set 1, the percentage counter value begins at 100%. The starting location is again twenty (20) revolutions from the top TOP, but since the revolution counter value now starts at the highest revolution value of two-hundred fifty (250), twenty (20) revolutions from the top at the arbitrary upper stop position AUSP equals to two-hundred thirty (230) revolutions. The system will count down to the upper limit slow down which is fifty-five 55 revolutions from the top TOP thus equaling one-hundred ninety five (195) revolutions. The system will continue to count down until it reaches two hundred twenty (220) revolutions from the top TOP which equals a revolution counter value of thirty (30) revolutions when counting down. Finally, the revolution counter value will reach the arbitrary lower stop position ALSP at two hundred forty (240) revolutions from the top TOP which equals a revolution counter value of ten (10) revolutions.

Figure 2B:
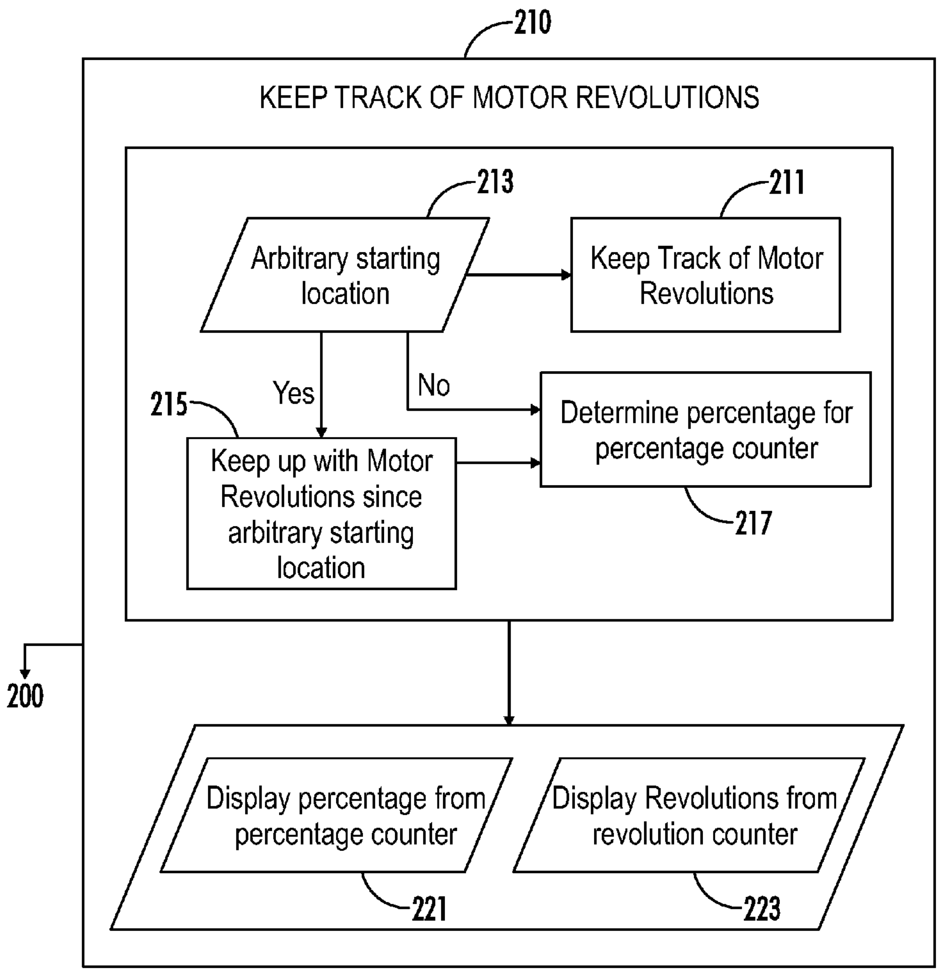
FIG. 2B is a flow diagram of the steps utilized to keep track of the hook height position with an electronic programmable limit switch.

Referring to the flow diagram in FIG. 2B, the basic steps of the process during operation are shown at step 200. Step 210 within step 200 is a generalization of the procedures explained above for keeping track of the revolution counter value and the percentage counter value. At step 211, the system keeps track of the number of revolutions. If an arbitrary starting location has been selected as shown in step 213, the system monitor the number of revolutions after the arbitrary starting location. At step 217, the system determines the percentage for the percentage counter value from the desired top location to the desired bottom location. As shown in step 220, these values are sent to a display. Step 221 displays the percentage from the percentage counter value and step 223 displays the number of revolutions from the revolution counter value. How the system will count down and where the starting location is set is determined, as explained above, from the selection of a limit option and a percentage option. The setting of these values may be dependent on other equipment on the hoist system that requires these values to be set in accordance with input requirements.

Referring again to FIG. 3, a display 80 that may be utilized to implement step 220 is shown. Furthermore, the output of the encoder 37 is directly input into the controller 39. The controller 39 also contains an input 82 for inputting the arbitrary top and bottom positions as well as selected slow down locations for the hoist system. These arbitrary top and bottom positions as well as other relevant values associated with implementing the disclosed methodology can be stored in the memory locations of a storage device 83. The controller 39 includes control wiring with an output 84 for operating the hoist braking system. This system also comes with an input 86 from the weighted limit switch for turning off the system in emergency situations, such as when the hook over-travels. Finally, signal output 88 is used to control the speed of the motor/drum revolutions.

When the revolution counter reaches the stop values, a stop sequence is begun in which the load is ramped to a stop. Consequently, although it is within the scope of this invention for the load to stop exactly when the revolution counter reaches a stop location value, the load generally is stopped approximately at or near the stop locations. The revolution counter may thus count past the stop location values. Ramping a load to a stop is well known in the art as are the commonly known ranges for stopping the load within a particular distance and interval of time. These distances and time intervals typically depend on set values for stopping the hoist system, including hoist speed and deceleration time. The hoist system is stopped "approximately" or "near" the stop locations in accordance with the distances and intervals of time known for ramping a load to a stop. The hoist system may then check the brake 40 to ensure that the brake 40 can hold the load.

Referring to FIG. 1C and FIG. 3, the hoist system may also have a key switch 90 to bypass the stopping mechanisms at the top and bottom of the hoist system. When the key switch 90 is on, the hook may go past the hoist system and trigger the weighted limit switch 50. The bypass function of key switch 90 should only be accessible to maintenance personnel, not the crane operator. The intended purpose of the key switch 90 is two-fold. First, the weighted limit switch 50 can be easily tested utilizing the key switch. The hook is allowed to go past the top of the hoist and hook onto the weighted limit switch 50 to assure that this fail safe is operating appropriately. Second, key switch 90 allows for a changing of the wire ropes by spooling all the rope off the hoist drum when the lower limit of the hoist system is by passed. The system may then need to be reset in accordance with the steps shown in FIG. 2A since the rope may be of a different length.

Figure 4A:
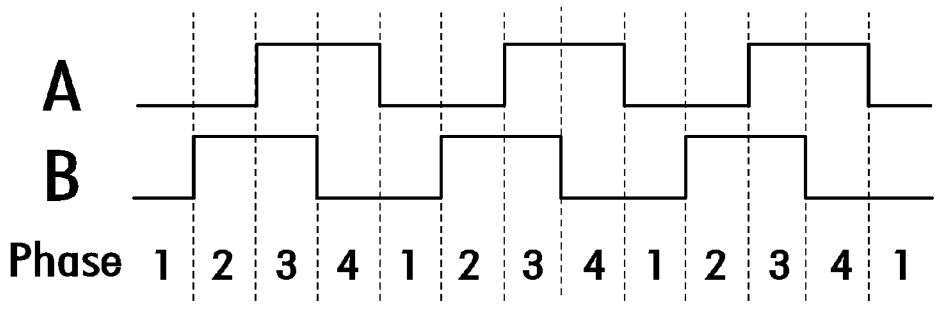
FIG. 4 is a diagram of one embodiment of the encoder.
Figure 4B:
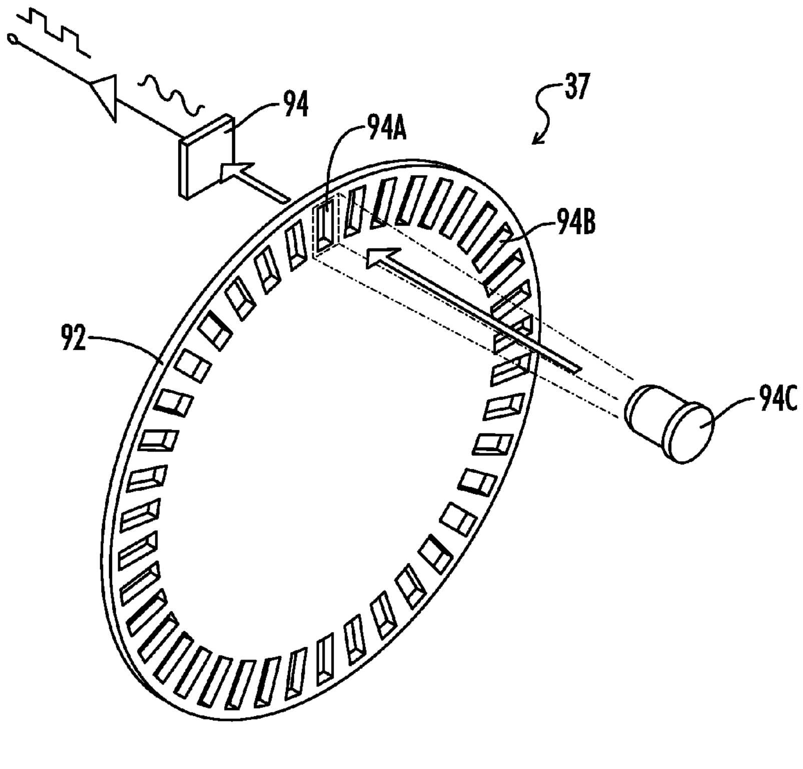

Referring now to FIGS. 4A and 4B, an embodiment of the incremental encoder 37 is shown. To generate the indicator signal, the incremental encoder 37 has a disc 92 coupled to the motor 10. When the motor rotates, the disc 92 also rotates. To determine that motor rotation has occurred, a photodiode 94 is placed at a fixed location on the hoist system. The photodiode 94 causes the transmission of the indicator signal whenever a line 94A on the disc 92 passes the photodiode field of view 94A. Every rotation of the motor 10 indicates that the shaft of the hoist system has been turned by a certain angular distance. The disc 92 also has another line 94B at an angular location of the disc. By having two lines 94A, 94B the direction of rotation of the disc can be determined according to the order in which the lines 94A, 94B pass the photodiode's field of view 94A.

While this embodiment of the incremental encoder 37 utilizes photodiode 94 and radial lines 94A, 94B to determine a rotation or a direction of rotation of the motor, any type of rotational sensing device may be utilized to perform these functions. For example, the incremental encoder 37 may instead utilize a magnetic pulse wheel and an independent sensor head having magnetized hash marks to determine the rotation of the motor. Furthermore, other embodiments of the incremental encoder 37 may be coupled to other hoist system components that rotate as a load is lifted or lowered.

Thus, although there have been described particular embodiments of the present invention of a new and useful Hoist System with an Electronic Programmable Limit Switch, it is not intended that such references be construed as limitations upon the scope of this invention except as set forth in the following claims.

What is claimed is:

1. A limit switch for use with a hoist system that lowers and lifts a load, the hoist system including a hoist motor controlled by a variable frequency motor drive and an electronic sensor that generates an indicator signal corresponding to one or more rotations of a component on the hoist system, the limit switch comprising:

a first input for receiving the indicator signal;

memory locations for storing top and bottom stop limit values associated with respective top and bottom stop limit locations on the hoist system;

a software module programmed to determine a current location value from the indicator signal, to compare the current location value with the top and bottom stop limit values, and to utilize the comparison between the current location with the top and bottom stop limit values to stop the lowering or lifting of the load at or near the stop limit locations;

a processor for executing the software module; and wherein the memory locations, the software module and the processor are components of and embedded in the variable frequency motor drive used by the hoist system.

2. The limit switch of claim 1, wherein:

the memory locations store a revolution counter value; and the software module is programmed to determine the current location value by incrementing the revolution counter value from one of the stop limit values according to the indicator signal.

3. The limit switch of claim 2, wherein:

the memory locations store a limit option value; and the software module is programmed so that a starting location value of the revolution counter corresponds to the top stop limit location value when the limit option value is a first value, and so that the starting location value of the revolution counter corresponds to the bottom stop limit location value when the limit option value is a second value.

4. The limit switch of claim 3, wherein:

the top stop limit location value is a user selected top stop limit location value corresponding to a number of component rotations produced when lowering or lifting the load from a hoist maximum location on the hoist system to a user selected top stop limit location on the hoist system;

the bottom stop limit location value is a user selected bottom stop limit location value corresponding to a number of component rotations produced when lowering or lifting the load from the hoist maximum location on the hoist system to a user selected bottom stop limit location on the hoist system; and the hoist maximum location is associated with a top limit of the hoist system when the limit option value is the first value and is associated with a bottom limit of the hoist system when the limit option value is the second value.

5. A limit switch for use with a hoist system that lowers and lifts a load, the hoist system including an electronic sensor that generates an indicator signal corresponding to one or more rotations of a component on the hoist system, the limit switch comprising:

a first input for receiving the indicator signal;

memory locations for storing a top and bottom stop limit value values associated with respective a top and bottom stop limit location locations on the hoist system;

a software module programmed to determine a current location value from the indicator signal, to compare the current location value with the top and bottom stop limit values, and to utilize the comparison between the current location with the top and bottom stop limit values to stop the lowering or lifting of the load at or near the stop limit locations;

a processor for executing the software module;

the memory locations store a limit option value;

the software module is further programmed so that a starting location value of the revolution counter corresponds to the top stop limit location value when the limit option value is a first value, and so that the starting location value of the revolution counter corresponds to the bottom stop limit location value when the limit option value is a second value;

the memory locations store a revolution counter value;

the software module is further programmed to determine the current location value by incrementing the revolution counter value from one of the stop limit values according to the indicator signal;

the memory locations store a height measurement value associated with a total number of component rotations required to lower or lift the load from a top limit of the hoist system to a bottom limit of the hoist system;

the top stop limit location value is associated with either a hoist maximum starting location value or the hoist maximum starting location value plus the height measurement value;

the bottom stop limit location value is associated with either the hoist maximum starting location value or the hoist maximum starting location value plus the height measurement value; and the top stop limit location value is associated with the hoist maximum starting location value, and the bottom stop limit location is associated with the hoist maximum starting location value plus the height measurement value when the limit option value is the first value, and the bottom stop limit location value is associated with the hoist maximum starting location value and the top stop limit location value is associated with the hoist maximum starting location value plus the height measurement value when the limit option value is the second value.

6. A limit switch for use with a hoist system that lowers and lifts a load, the hoist system including an electronic sensor that generates an indicator signal corresponding to one or more rotations of a component on the hoist system, the limit switch comprising:

a first input for receiving the indicator signal;

memory locations for storing a top and bottom stop limit value values associated with respective a top and bottom stop limit location locations on the hoist system;

a software module programmed to determine a current location value from the indicator signal, to compare the current location value with the top and bottom stop limit values, and to utilize the comparison between the current location with the top and bottom stop limit values to stop the lowering or lifting of the load at or near the stop limit locations;

a processor for executing the software module;

the memory locations store a revolution counter value;

the software module is further programmed to determine the current location value by incrementing the revolution counter value from one of the stop limit values according to the indicator signal;

the memory locations store a height measurement value associated with a total number of component rotations required to lower or lift the load from the top limit of the hoist system to the bottom limit of the hoist system and a percentage counter value; and the software module is further programmed to increment the percentage counter value, the percentage counter value being associated with a value equaling the revolution counter value divided by the height measurement value.

7. The limit switch of claim 6, wherein:

the memory locations store a percentage option value; and the software module increments the percentage counter value toward 100% when the hoist system is lowering the load if the percentage option value is a first value and increments the percentage counter value toward 100% when the hoist system is lifting the load if the percentage option value is a second value.

8. The limit switch of claim 1, wherein:

the memory locations store a top and bottom slow down location value associated with slow down locations on the hoist system; and the software module is functional to cause the hoist system to slow down when the current location value reaches one of the slow down location values.

* * * * *